US006434744B1

(12) United States Patent
Chamberlain et al.

(10) Patent No.: US 6,434,744 B1
(45) Date of Patent: Aug. 13, 2002

(54) SYSTEM AND METHOD FOR PATCHING AN INSTALLED APPLICATION PROGRAM

(75) Inventors: Benjamin C. Chamberlain; D. Gordon Hardy, both of Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/261,864

(22) Filed: Mar. 3, 1999

(51) Int. Cl.⁷ .............................................. G06F 9/455
(52) U.S. Cl. ...................... 717/168; 717/170; 717/174
(58) Field of Search ........................... 717/11, 168, 170, 717/173, 174, 120; 703/23; 707/8, 203, 206; 714/2

(56) References Cited

U.S. PATENT DOCUMENTS

| | | | | |
|---|---|---|---|---|
| 5,577,244 A | * | 11/1996 | Killebrew et al. | 717/169 |
| 5,845,077 A | * | 12/1998 | Fawcett | 709/221 |
| 5,966,540 A | * | 10/1999 | Lister et al. | 717/174 |
| 6,009,274 A | * | 12/1999 | Fletcher et al. | 717/11 |
| 6,049,671 A | * | 4/2000 | Slivka et al. | 717/11 |
| 6,052,531 A | * | 4/2000 | Waldin, Jr. et al. | 717/11 |
| 6,073,214 A | * | 6/2000 | Fawcett | 711/133 |
| 6,073,252 A | * | 6/2000 | Moyer et al. | 714/7 |
| 6,135,651 A | * | 10/2000 | Leinfelder et al. | 717/168 |
| 6,161,218 A | * | 12/2000 | Taylor | 717/174 |
| 6,167,567 A | * | 12/2000 | Chiles et al. | 717/11 |
| 6,199,203 B1 | * | 3/2001 | Saboff | 717/11 |
| 6,199,204 B1 | * | 3/2001 | Donohue | 717/11 |
| 6,279,156 B1 | * | 8/2001 | Amberg et al. | 717/124 |
| 6,305,010 B2 | * | 10/2001 | Agarwal | 717/126 |

OTHER PUBLICATIONS

Hicks et al., "Dynamic software updating", ACM PLDI, pp 13–23, Jun./2001.*
Hollingsworth et al., "Using content derived names for configuration management", ACM SSR, pp 104–109, Sep./1997.*
Sherwood et al, "Patchable instruction ROM architecture", ACM CASES, pp 24–33, Nov./2001.*
Murtha, "The development of a configuration control tool", IEEE, pp 265–268, 1991.*

* cited by examiner

Primary Examiner—Anil Khatri

(57) ABSTRACT

A system and method for patching an installed application program and making an installer program aware that an application has been patched is disclosed. The system and method recognizes that a patch has been launched to update the application, the patch including an identifier for the application and information related to a desired change to the application. In response, the installer program accesses a first information store containing information related to a series of functions for installing the application. The installer program also accesses a second information store containing information related to the installed state of the application. Then, the installer program modifies the first information store in accordance with the desired change to the application such that the modified first information store includes additional functions for applying the patch to the application. The installer program then initiates a reinstallation of the application based on the modified first information store such that the desired change is reflected in the application after the reinstallation, i.e., the application is patched. Finally, the installer program stores a new installed state of the application in the second information store, the new installed state including an indication that the patch exists for the application and information related to the desired change to the application.

41 Claims, 11 Drawing Sheets

SYSTEM AND METHOD FOR PATCHING AN INSTALLED APPLICATION PROGRAM

FIELD OF THE INVENTION

The present invention relates generally to the installation of software applications on a computer system, and more particularly to patching a software application on a computer system.

BACKGROUND OF THE INVENTION

Software application installation is an area of increasing importance. Unfortunately, existing installation technologies fail to address all of a computer user's needs. Most installation technologies are simply brute-force mechanisms for copying program files from one location to another. Only one known installer program even comes close.

The one installer program that comes close to addressing all of a computer user's needs manages the installation of an application so that information related to of each of the application's resources is stored in a "configuration database." The configuration database may be registry keys within the system registry, or it may be a stand-alone database. The stored information includes, but is not limited to, the installed state of the application (i.e., what features of the application are or are not installed, whether the application should be run locally or run from a source, paths to the program files of the application, whether features are "advertised" but not installed, etc.). That information is stored at install time and is used by the installer program to ensure that an application always has available the resources that it expects or that the user requests. For instance, one function of the installer program is to verify the existence of a resource needed by the application. When the application requests a path to a program file, the installer program verifies the existence of that program file at the expected location stored in the configuration database. If, for some unexpected reason, the program file does not exist at the expected location, the installer program installs the program file prior to returning its path to the application. The installer program continually updates the configuration database if any changes are made to the installed state of the application.

Generally speaking, "patching" refers to the art of modifying or updating an application from one state to another state. Often, patching is performed if an application is in need of a service release or update to remedy a programming bug or other infirmity. Patching is traditionally performed by executing a patching application which makes slight modifications to the installed application's files or resources. Patching is traditionally a brute-force mechanism to revise an application from one version to another version without completely reinstalling the application. Unfortunately, there are several problems with traditional patching.

First, the traditional patch modifies the resources of the application, but does not modify the configuration database maintained by the installer program to reflect those modifications. For example, a patch will often add a new program file to the application. However, the patch does not modify the configuration database to make the installer program aware of the existence of the new program file. In addition, the installer program is unable to update its configuration database to reflect the existence of the new file because the patch and new file were not installed by the installer program. The result is that the installer program is unaware that the new program file was added, so any additional functionality provided by the installer program is unavailable for that new program file. For example, the installer program is unable to verify the existence of the new program file if requested by the application.

Another problem with traditional patches is that they may not be able to properly patch an uninstalled or partially-installed application. At installation, the user may choose not to install all of the features of an application, but rather delay the installation of certain features until they are actually used. The installer program may provide an application with the ability to offer the feature as available although the feature is uninstalled ("advertising" the feature). When the user or application attempts to access that feature for the first time, the installer program then automatically installs the advertised feature. This reduces the amount of storage space consumed by features of an application which are not initially used.

Unfortunately, although the installer program maintains information concerning any advertised features, the traditional patch does not make use of that information. Consequently, when the traditional patch attempts to update an application, any files or resources that are advertised but not installed are not updated. Compounding the problem is the situation where the user selects an advertised feature for the first time after the patch has been applied. The user will likely be unaware that the patch did not update resources related to the advertised feature and therefore will not execute the patch a second time to update the newly-installed resources. Indeed, the user may even be unaware that the advertised feature was just installed. The unhappy result is that the user believes the application to have been fully updated by the patch when that is not the case. Even worse, the application may be left in a mixed state having some resources of one version and other resources of another version. Such a mixed state can be prone to unexpected application errors during use.

Accordingly, there exists a need in the art for an improved method of patching a software application. In addition, a need exists for a method of patching a software application that modifies stored information to properly reflect the installed state of a patched application.

SUMMARY OF THE INVENTION

The present invention is directed to a system, method, and computer-readable medium for patching a software application and providing an installer program with notice of the patch's existence so that the installer program can modify a configuration database to reflect the patch. Simply stated, the present invention makes the installer program patch-aware so that should the user or application make or require any changes to the installed state of the application, the installer program will be able to operate on the system resources with knowledge that the application has either been patched, or that a patch is present for the application (in the case where the application is not yet fully installed). In that manner, all of the additional functionality provided by the installer program to an application is equally applicable to the application in its patched state.

In one embodiment, the installer program is provided with the capability to recognize the launch of a patch file. The patch file may include multiple streams of information, including summary information regarding which application is affected by the patch, transform information regarding changes to an installation file associated with the application, and update information to effect the necessary bit-level changes to existing program files of the application. When the patch file is launched, the installer program uses the summary information to verify that the affected application is installed. Once verified, the installer program initiates an install procedure for the application by reading an installation file associated with the original (unpatched) version, i.e., the installed version of the application. The installation file typically contains information, such as a series of instructions for installing the application, used by the installer program to install the application. For instance, the installation file may define a source for the installation files, registry key values applicable to the application, directory paths for certain files, particular groupings of files to be installed together depending on the user's installation selections, and the like.

The transform information from the patch file provides the installer program with changes (deletions, additions, or modifications) to be applied to the installation file. The installer program modifies entries in the installation file based on the transform information. Applying the transform information to the installation file results in a modified installation file which defines additional instructions to be performed during a subsequent re-installation of the software application resulting in a patched software application being installed. The modified installation file may reference the patch file as a source for any new program files added by the patch. Any new program files to be added are stored in the update information stream of the patch file.

The modified installation file may include a new portion pertaining to existing program files that are altered by the patch. The new portion of the modified installation file identifies which existing program files must be altered, and identifies which binary bits in the update information stream of the patch file are used to perform the alteration.

Once the modified installation file is achieved, the installer program reinstalls the software application using the modified installation file. Reinstalling the application using the modified installation file results in the installer program storing the patched state of the application in the configuration database. In other words, when the installer program performs its installation, any information related to the patch is stored in the configuration database just like the original installation information for the application. In this way, the installer program maintains full knowledge of any new or modified software application resources related to the patch. This aspect of the invention allows the full functionality of the installer program to attach to the resources added or modified by the patch. In this embodiment of the invention, the modified installation file is not stored for future reference. Rather the configuration database contains an indication that the patch exists so that the original installation file may be modified in accordance with the patch during any subsequent installation or reinstallation operation.

An alternative embodiment of the present invention provides for the patching of network images of software applications. Those of ordinary skill in the art will understand that the network image is essentially a network-resident installable copy of a software application. The process of creating a network image on a server for access by server clients is often called a "network image install" or an "admin install." The network image allows individual users to install the application to their local machines from the server rather than from the original source medium. Patching the network image serves the purpose of allowing the server clients to install a patched version of the application, rather than installing the application and then patching each individual install.

In accordance with this invention, a system administrator patches a network image by launching a patch file from a computer coupled to the server storing the network image of the software application to be patched. Launching the patch file is accomplished in a conventional manner, e.g., inserting a source medium into the computer and instructing the computer to launch the patch file. The system administrator may provide to the patch file, via an API parameter or other means, a path to the network image and an indication that the patch will be applied to the network image. The installer program detects the launch of the patch file and, in response, opens the installation file by accessing the network image location. As above, the installer program creates a modified installation file from the original installation file based on the transform information stored in the patch file. Based on the modified installation file, the installer program creates a new network image of the application by copying unchanged resources of the application from the source medium to the network image location, by copying any new resources from the patch file to the network image location, and by altering any existing resources with patch-bits from the patch file in accordance with instructions contained in the new installation file.

In addition, this alternative embodiment of the invention writes a new installation file, based on the modified installation file, to the network image location. The new installation file reflects the patched version of the application and, accordingly, does not include instructions to reapply the patch during any subsequent installs from the network image. As a result, when users install from the network image, their installed instance of the application is already patched, eliminating the need to install the original software application and, then, apply a patch at their local machine.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention is directed to a system, method, and computer-readable medium for patching a software application and providing an installer program with notice of a patch's existence so that the installer program can modify a configuration database to reflect the patch. Simply stated, the present invention makes the installer program patch-aware so that should the user or application make or require any changes to the installed state of the application, the installer program will be able to operate on the system resources with knowledge that the application has either been patched, or that a patch is present for the application. Briefly described, the present invention provides a mechanism by which the launching of a patch file, termed a "patch package," is passed to the installer program and the installer program takes control of applying the patch. In this manner, the installer program is able to store information related to the patch to ensure the proper operation of the installer program and the patched application.

Exemplary Operating Environment

Figure 1:
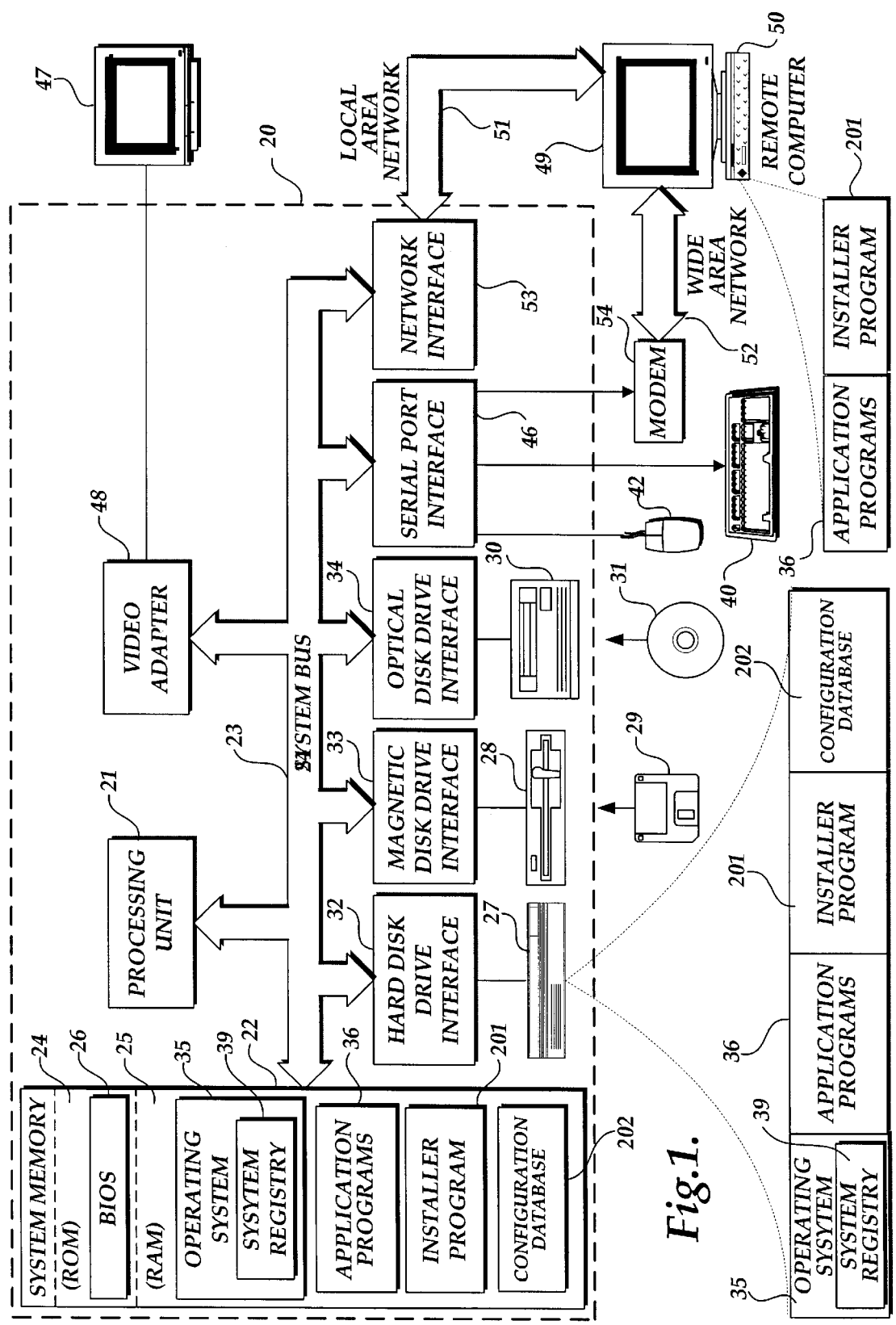
FIG. 1 is a functional block diagram of an exemplary operating system in which the present invention may be practiced.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules, such as an installer program 201 in accordance with an exemplary embodiment of the present invention, and program data, such as a configuration database 202 associated with the installer program 201. The operating system 35 may include a system registry 39. In this embodiment, the invention may reside within the installer program 201 and the configuration database 202. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device 50. It will be appreciated that the network connections shown are exemplary and other means of establishing a communications link between the computers may be used.

Overview of Installation Procedure

Figure 2:
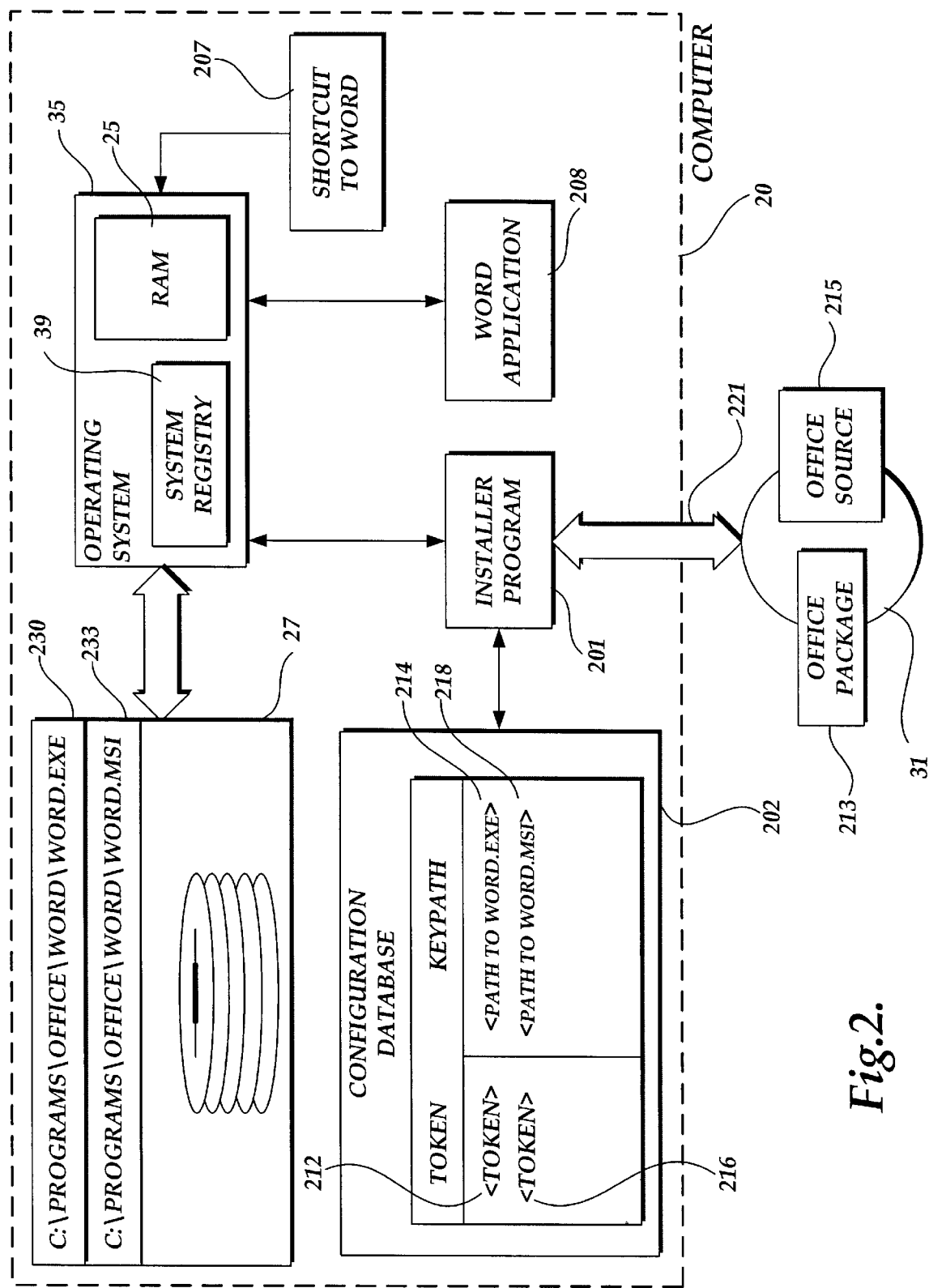
FIG. 2 is a functional block diagram of a computer environment including an exemplary installer program modified in accordance with one embodiment of the present invention and associated programs and resources that illustrate the broad functionality of the installer program.

FIG. 2 is a functional block diagram of a computer environment including an installer program 201 constructed in accordance with an exemplary embodiment of the present invention. The computer environment may be the conventional personal computer 20 including the installer program 201, a configuration database 202, an operating system 35, a hard-disk drive 27, a "shortcut" to an application 207, and an executing application 208. Each of those items is described and discussed in greater detail below.

Also illustrated are a package file 213 and a source 215. The package file 213 and the source 215 may reside on a CD-ROM disk 31 accessible to the computer 20 via an optical disk drive 30 and over transmission path 221. The package file 213 and the source 215 may also exist in any other location accessible by the computer 20. The package file 213 and the source 215 are discussed in further detail below. The functionality and construction of the installer program 201 is best described by example, through the installation, execution, and patching of a product.

To begin, a user initiates the installation of the product, such as the Microsoft Office application program. Initiating the installation may constitute the act of inserting CD-ROM disk 31 in optical disk drive 30, or the act of executing a remote startup script over LAN 51, or any other means of initiating the installation. Once the installation is initiated, the installer program 201 assumes control of processing.

The installer program 201 begins the installation by reading the package file 213 into memory, such as RAM 25. The package file 213 is unique to the product and is essentially a database that describes, among other things, the relationships between the features, components, and resources of the product. The package file 213 may also include information defining several registry key values for entries in a system registry 39 maintained by the operating system 35.

The installer program 201 reads the package file 213 and uses the information stored within to determine the installation operations that must be performed for the product. For instance, the installer program 201 may display a dialog box that presents the user with the option of selecting which features of the product to install. The user may then select which features to install to the computer 20.

The source 215 contains the program files associated with the features of the application to be installed. Those program files making up the selected features are copied from the source 215 to an appropriate location on the computer 20, such as to the hard-disk drive 27. If the user identifies a particular location within the file system of the hard-disk drive 27 for a feature, the installer program 201 will write the program files associated with that feature to the identified location.

During the installation process, the installer program 201 creates several entries in both the system registry 39 and the configuration database 202. As discussed above, the configuration database 202 may be a portion of the system registry 39. When a program file is written to an appropriate location, the installer program 201 creates an entry in the configuration database 202 corresponding to the program file. The program file may be identified in that entry by a "token." The term "token" as used herein refers to any identifier capable of uniquely distinguishing one program file or component from other program files or components. Also in the entry, the path to that program file within the file system is associated with the token.

In the disclosed example, the product installed may include a program file 230 named "word.exe". The installer program 201 may copy the word.exe program file 230 from the source 215 to the location on the hard-disk drive 27 identified by the path "C:\Programs\Office\Word\." The installer program 201 then creates an entry in the configuration database 202 including a token 212 identifying the word.exe program file 230 and the path 214 to that program file. In a similar manner, an installation file 233, named "word.msi," may be written to the path "C:\Programs\Office\Word\," and an entry in the configuration database 202 may be created with a token 216 identifying the installation file 233, and a path 218 to the installation file 233. The installation file 233 is described in greater detail below.

The installer program 201 continues with the installation process until all of the program files for the application are written to the appropriate locations on the computer 20. When all of the program files are written, installation is complete and the configuration database 202 is populated with an entry for each installed program file. In addition, the configuration database 202 includes summary information related to the installed state of the application, including which program files were installed, what version of the application is installed, and the like.

Applying a Patch

Figure 3:
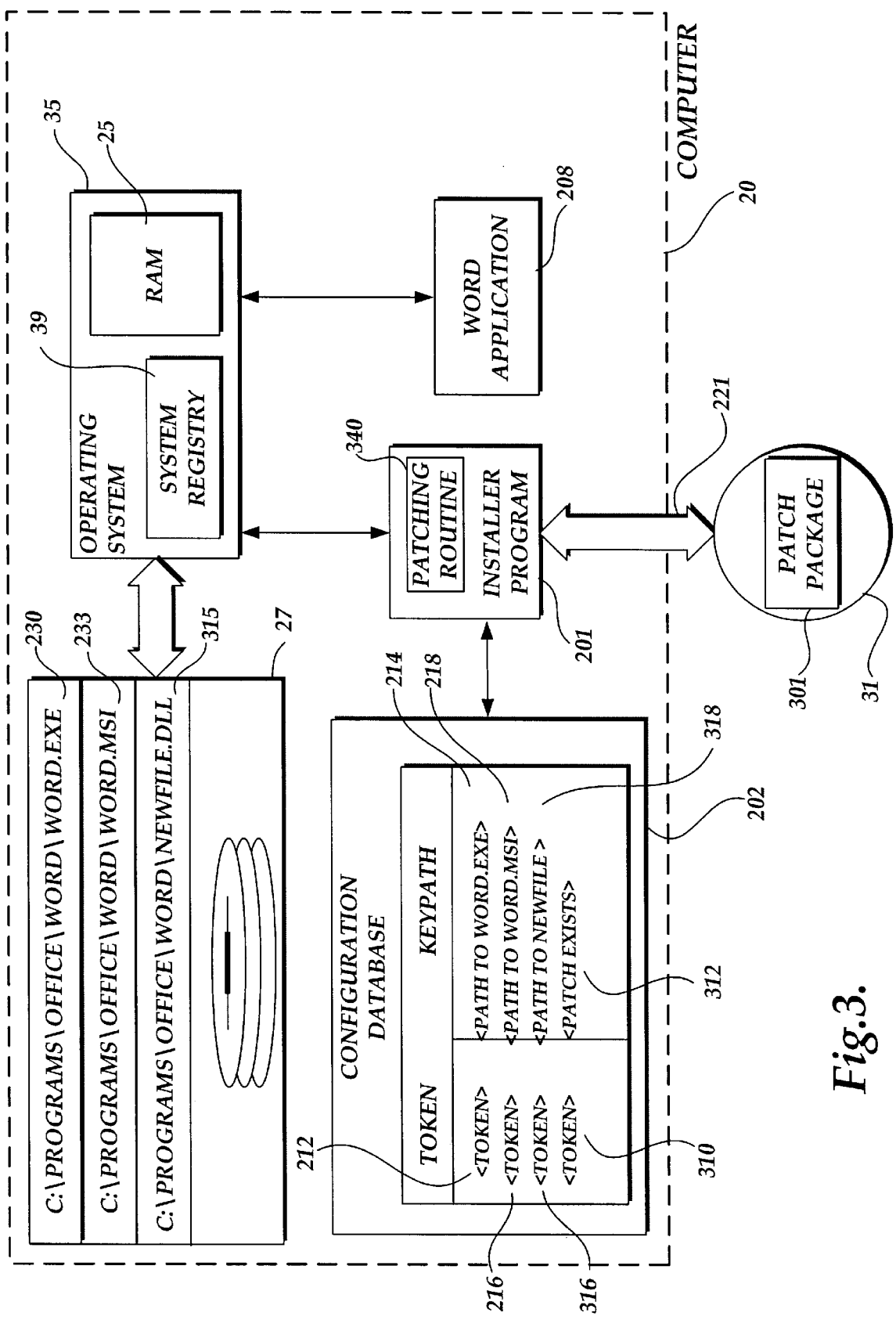
FIG. 3 is a functional block diagram of the installer program and associated programs and resources of FIG. 2 illustrating an overview of the functions performed during a typical patching operation.
Figure 4:
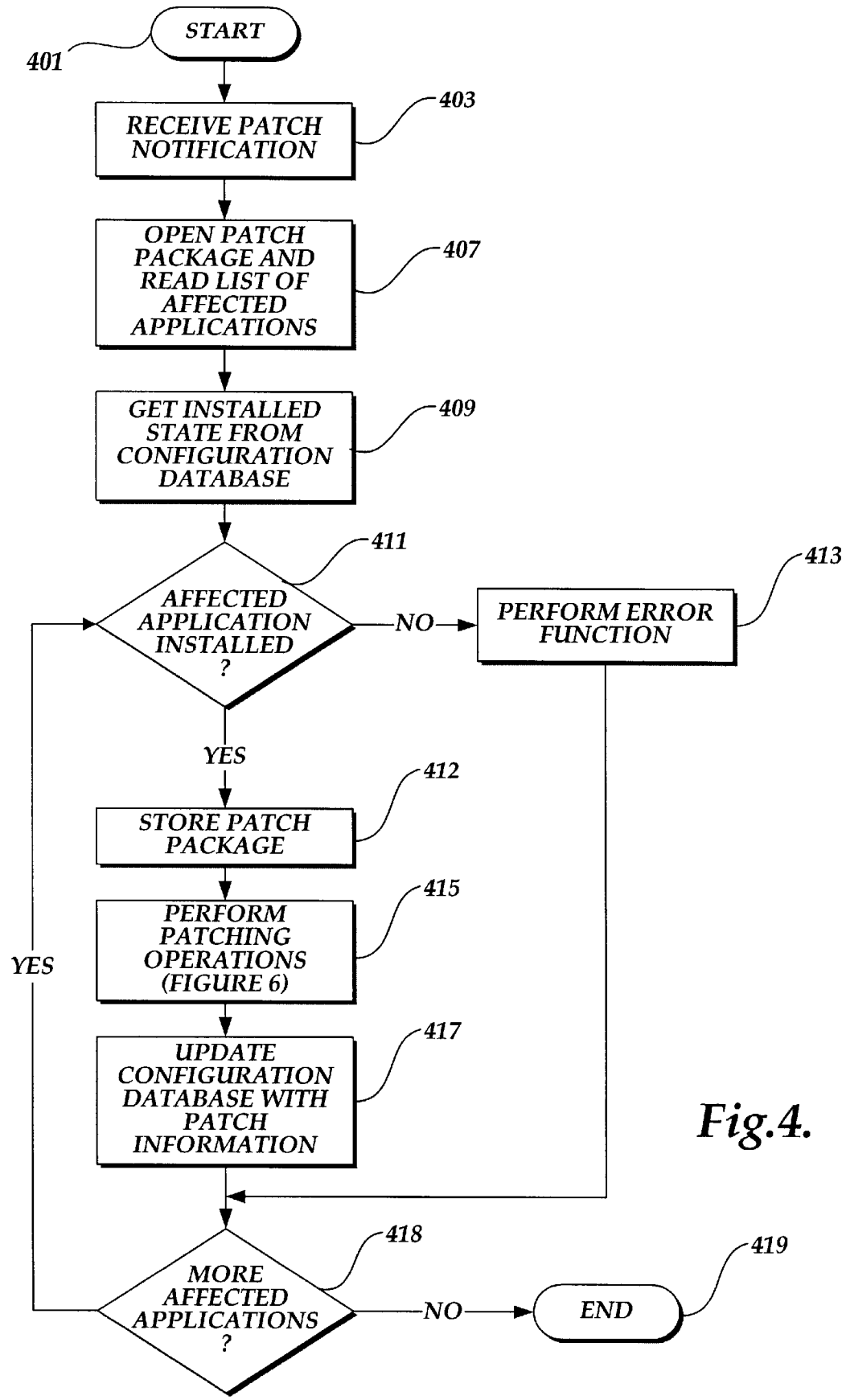
FIG. 4 is a logical flow diagram illustrating steps performed by one embodiment of the present invention during a typical patching operation.

FIG. 3 is a functional block diagram illustrating how, in accordance with the invention, a patch is applied to an installed application. FIG. 4 is a logical flow diagram depicting a process 400 performed by the installer program 201 to apply the patch. FIG. 4, taken in conjunction with FIG. 3, illustrate how the installer program 201 applies a patch and achieves the benefits provided by the present invention. The process 400 begins at step 401 of FIG. 4 where the user has acquired a patch package 301. The patch package 301, discussed in further detail below, may reside on a CD-ROM Disk 31 or on the hard disk drive 27 of a computer 20. Alternatively, users may download a patch package, such as patch package 301, from a location on the Internet. Once the user has acquired the patch package 301, the user launches the patch package 301 and processing continues at step 403.

At step 403, the installer program 201 receives a notification that the patch packaged 301 has been launched. For instance, the patch package 301 may include software code or routines that, when triggered by the user, issue to the installer program 201 an instruction to apply the patch. One example of such a notification may be an Application Programming Interface ("API") call instructing the installer program 201 to apply the patch. When the installer program 201 receives the notification, processing continues at step 405.

At step 405, the installer program 201 begins applying the patch by copying the patch package 301 to a pre-determined location on the hard disk drive 27 of the computer 20. By storing it on the hard disk drive 27, the patch package 301 is available for future installation or patching operations. The location may be a particular folder on the hard disk drive 27, such as a WINDOWS folder containing program files for the operating system 35. With the patch package 301 stored, processing continues at step 407.

Figure 5:
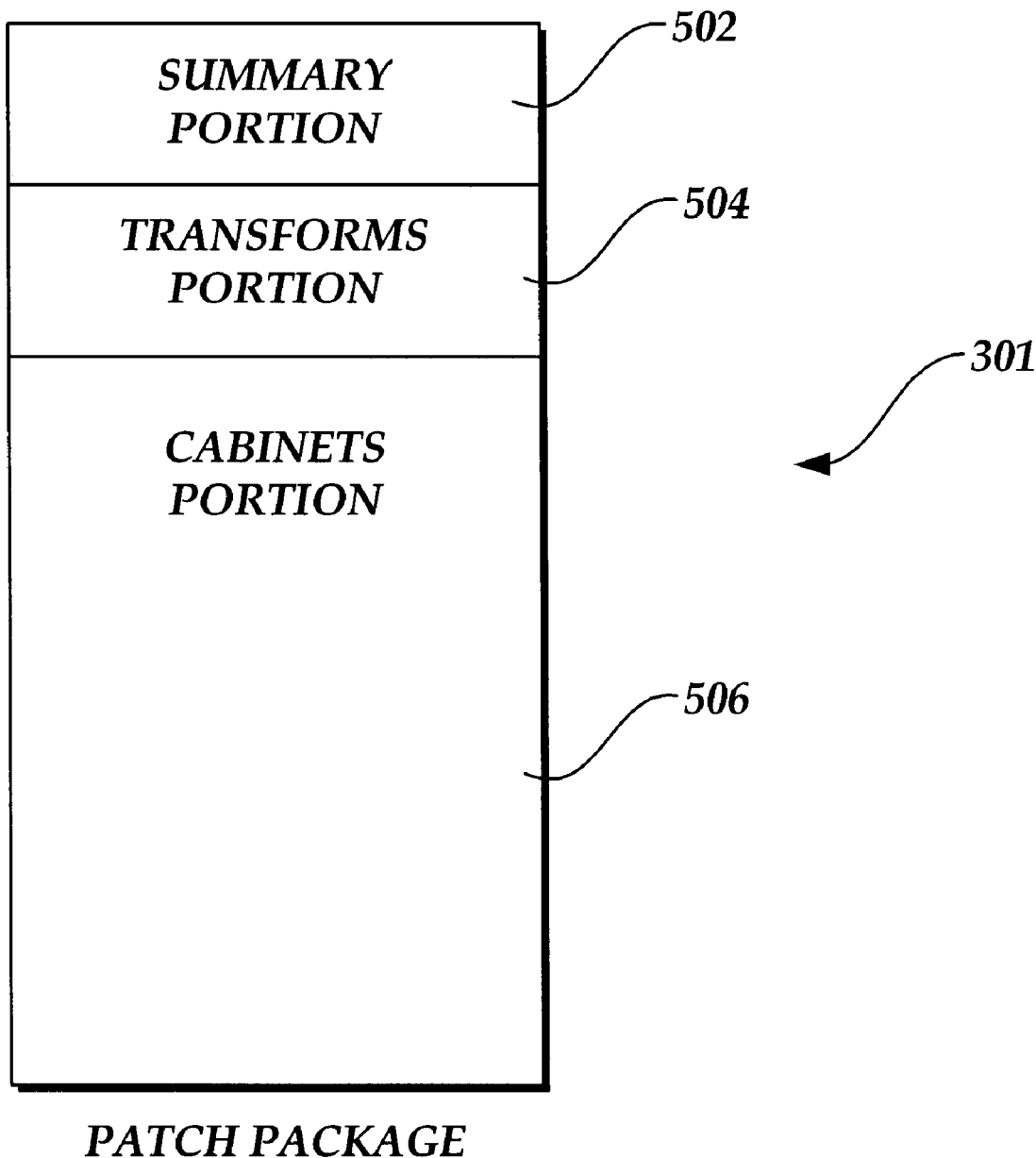
FIG. 5 is a functional block diagram of a typical patch file.

At step 407, the installer program 201 opens the patch package 301 and reads a list of affected software applications. To better understand the format of the patch package 301, FIG. 5 provides a functional overview of the several information streams within a typical patch package 301. The first information stream is termed the "summary" portion 502. The summary portion 502 includes information related to the patch package 301 as well as information related to the software application(s) to be patched. For instance, the summary portion 502 includes an identifier for each software application to be patched or affected by the patch. The summary portion 502 also includes a listing of each of the other portions of the patch package 301 and information describing the functionality of each.

The second information stream is termed the "transforms" portion 504. The transforms portion 504 is described in greater detail below, but, briefly described, includes information sufficient to modify the configuration database 202 and the installation file 233 to properly apply the patch.

The third information stream is termed the "cabinets" portion 506. The cabinets portion 506 include the actual program files, if any, added to the installed application by the patch. In addition, the cabinets portion 506 includes "patch bits," which are binary bits of information used during processing to modify or alter certain existing program files related to the installed application. Although illustrated here as an integral portion of the patch package 301, the cabinets portion 506 may be a file, such as a cabinet file, that is separate from the patch package 301. The cabinets portion 506 of the patch package 301 is analogous to the source 215 illustrated in FIG. 2. Since those skilled in the art are familiar with the use of cabinets or cabinet files in connection with application program patches, such files are not further described here.

Returning now to step 407 of FIG. 4, the installer program 201 reads the summary portion 502 of the patch package 301 and identifies which applications are affected by the patch. As suggested above, applications may be identified in the summary portion 502 by a product code or identifier uniquely distinguishing each application affected by the patch. Previously, when the installer program 201 installed an application, the product code for that application is stored in the configuration database 202 or the system registry 39. Processing continues at step 409.

At step 409, the installer program 201 reads the installed state of the application from the configuration database 202. The installer program 201 may read all of the information related to the installed application, or may read only enough information to identify which application is installed and the version of that application. The installer program 201 may additionally retrieve information related to which of several features of the application are installed, and whether any features are configured to be installed upon first use. Although this example deals with only one installed application, it should be appreciated that several applications may be installed and reflected in the configuration database 202 and the system registry 39. Processing then continues at decision block 411.

At decision block 411, the installer program 201 queries whether any products affected by the patch are installed. The installer program 201 may compare the identifiers stored in the summary portion 502 of the patch package 301 with identifiers in the configuration database 202 to determine whether an affected product is installed. If no affected product is installed, processing continues at step 413 where an error function is performed. The error function may include notifying the user that an affected product is not installed, or any other acceptable error function. Processing then proceeds to step 418. If, however, an affected product is installed, the decision block 411 returns a positive indication and processing proceeds to step 415.

At step 415, the patching operations necessary to update the installed application are performed. As discussed in greater detail below with respect to FIG. 6, the patching operations may include adding new program files to the installed application, altering existing program files associated with the application, modifying entries within the system registry 39 associated with the application, or other patching operations as is known to those skilled in the art. For example, the patching operations may include installing a new program file, such as "newfile.dll" 315, to the hard disk drive 27 of the computer 20. Once the patching operations are complete at step 415, processing proceeds to step 417.

At step 417, the installer program 201 updates the configuration database 202 to reflect the existence of the patch, and to reflect the proper installed state of the application after the patch has been applied. For example, the installer program 201 may add a patch entry 310 in the configuration database 202 indicating the existence of the patch. A value 312 associated with the patch entry 310 may indicate that the patch is installed. Likewise, a new token 316 may be stored and associated with a path 318 to the new program file newfile.dll 315. Other entries may also be added to the configuration database 202, such as tokens and paths to other new program files added by the patch, a patch source list to indicate alternative source locations for the patch package 301 for future operations, and other entries as will become apparent to those skilled in the art upon a thorough study of this disclosure.

Updating the configuration database 202 to reflect the patch allows the installer program 201 to continue to provide post-installation support to the installed software applications while also providing that support to elements of the application either added or modified by the patch. Processing proceeds to decision block 418.

At decision block 418, a determination is made whether another application remains to be patched. If the patch package 301 affects more than one application, and an additional application remains to be patched, the process follows the "yes" branch and loops back to step 409 where the process repeats as described above. If no further applications remain to be patched, processing proceeds to ending step 419 where the process terminates.

Figure 6:
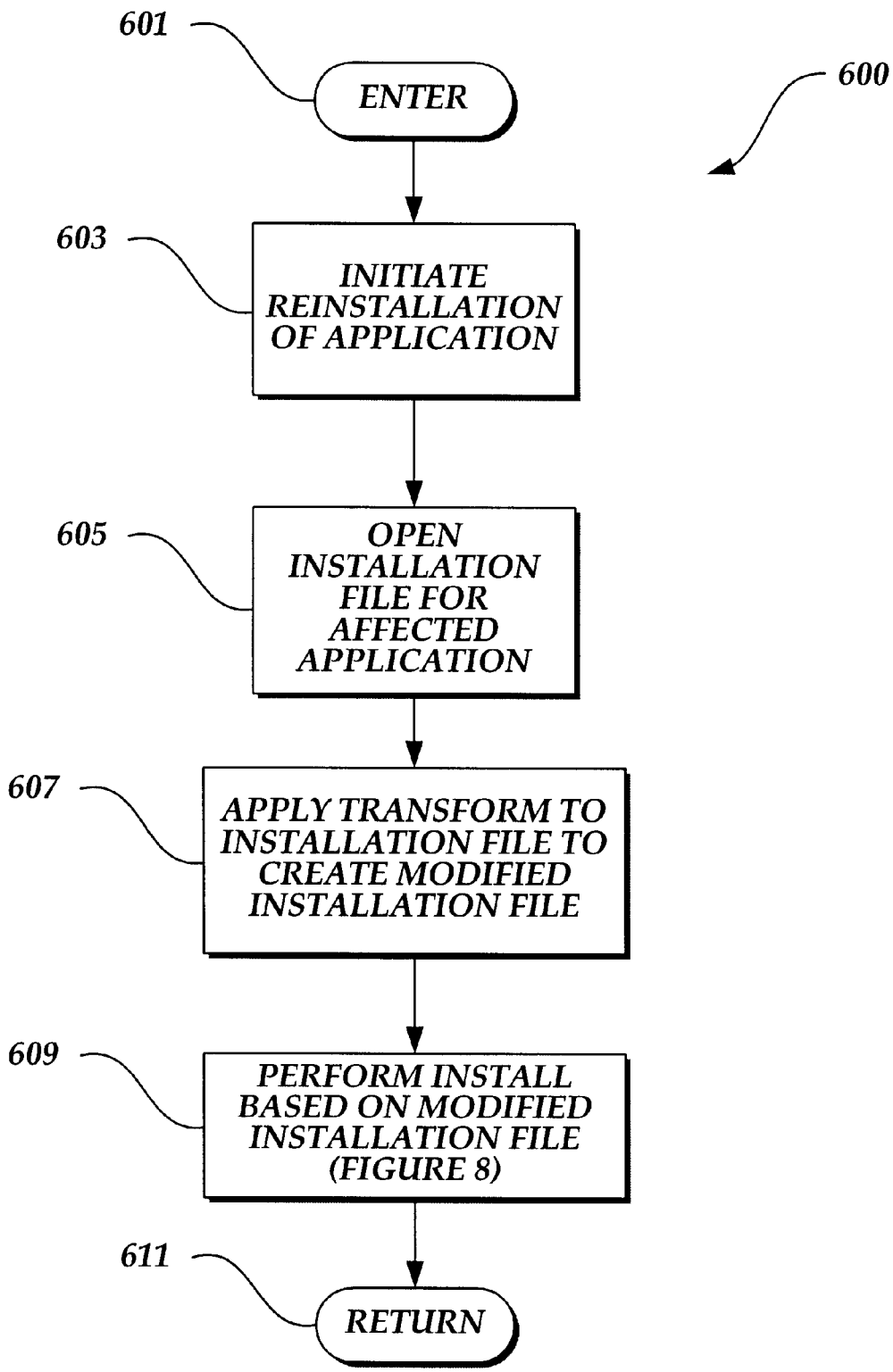
FIG. 6 is a logical flow diagram illustrating in detail the steps performed during the perform patching operations step illustrated in FIG. 5.

FIG. 6 is a functional flow diagram illustrating in more detail the patching operations that occur at step 415 of FIG. 4. To begin, the process 600 enters at step 601. At this point, an affected software application has been identified, and the patching operations are to begin. Processing proceeds at step 603.

At step 603, where the patching operations begin, the installer program 201 initiates an installation (or more precisely a reinstallation) of the application. In this embodiment of the invention, the installer program 201 performs the patching operations by incorporating information stored within the patch package 301 while reinstalling the application. The installer program 201 is able to incorporate the patch information because, unlike prior patching methods, the installer program 201 has knowledge that the patch exists. Because the installer program 201 received notification that the patch exists (at step 403 of FIG. 4) and stored the patch package 301 (at step 405 of FIG. 4), the installer program is able to modify the typical installation procedure. illustrated in FIG. 2 and described above to incorporate the patch. To continue with the installation, processing proceeds to step 605.

At step 605, the installer program 201 retrieves and opens the installation file 233 associated with the installed application. As noted above, the installation file 233 is a program file having, in the exemplary embodiment of the invention described herein, the ".msi" file extension. The installation file 233 contains information describing each of the resources of the application, certain relationships between those resources, system registry key value definitions for all of the features of the application, default folder hierarchy for the application's program files, and any other information necessary for the installer program to install the application. The installer program 201 stores the installation file 233 along with other program files for the application during the original installation. Consequently, the retrieved and opened installation file 233 properly defines each of the resources needed for the application in its original state, but does not reflect any changes dictated by the patch. With the installation file 233 opened, processing proceeds at step 607.

Figure 7:
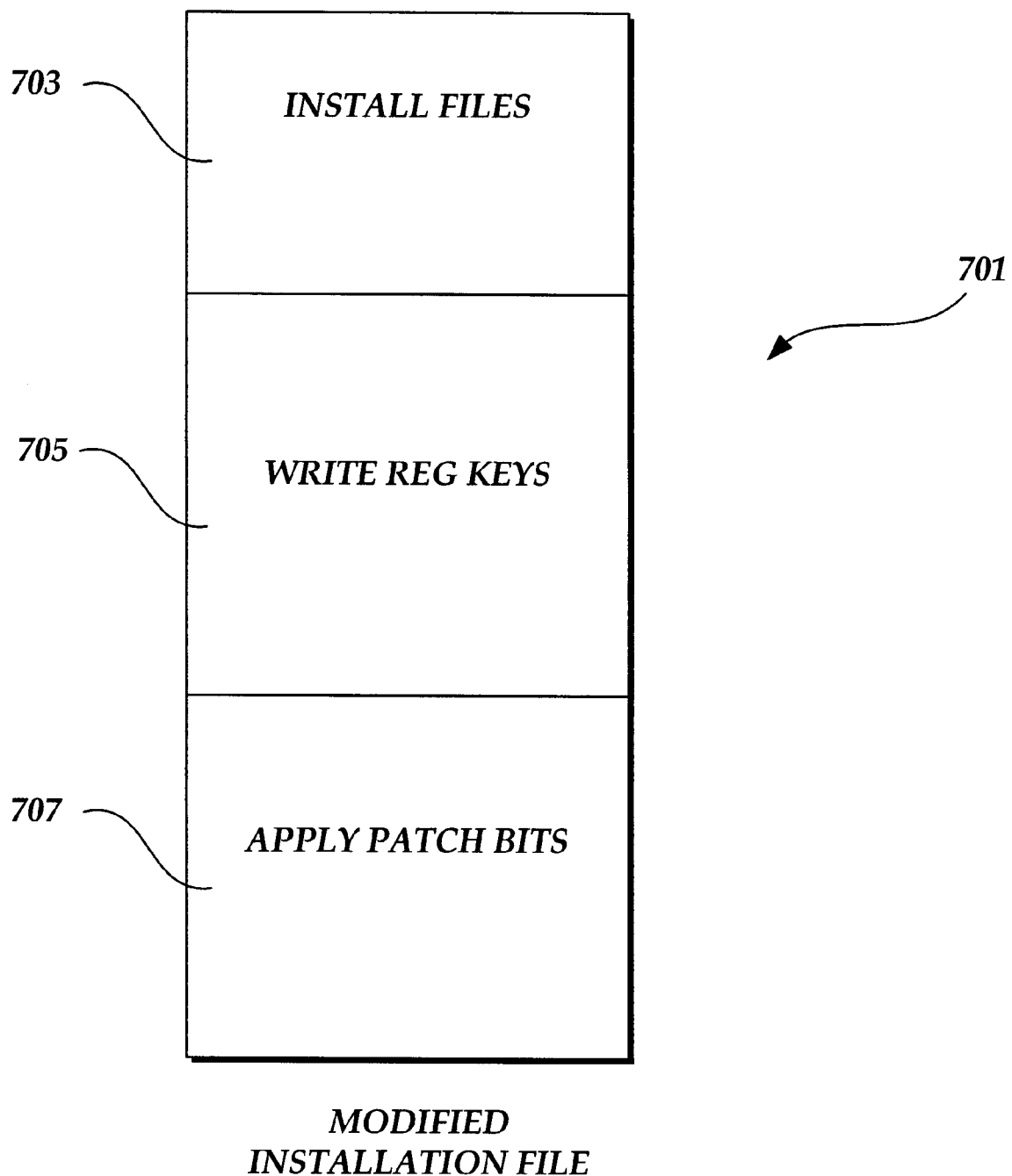
FIG. 7 is a functional block diagram of a typical installation file.

At step 607, the installer program 201 applies the transform 504 information to the installation file 233 resulting in the creation of a modified installation file 701, which is functionally depicted in FIG. 7. As mentioned above, the installation file 233 essentially dictates the operations to be performed by the installer program 201 when installing the application. Also as mentioned above, the transform portion 504 of the patch package 301 includes information sufficient to modify the installation file 233 so that the patch is properly applied. More particularly, the transform portion 504 of the patch package 301 includes instructions and information that cause the installation file 233 to be converted into the modified installation file 701 illustrated in FIG. 7.

At step 607, the installer program 201 makes the changes to the installation file 233 defined by the transforms 504. For example, the patch may add program files to the application. To that end, the transforms portion 504 may define additional instructions for an "install files" portion 703 of the modified installation file 701 depicted in FIG. 7. The installer program 201 writes the new instructions to the install files portion 703 of the modified installation file 701. The instructions may inform the installer program 201 which new program files are to be installed, as well as define a source for the new program files. In the case where the patch eliminates the need for an existing program file, the transform 504 may include instructions to delete an existing program file. Those instructions are also written to the install files portion 703 of the modified installation file 701.

In a similar manner, the transforms may define additional instructions for a "reg keys" portion 705 of the modified installation file 701. The additional instructions for the reg keys portion 705 may include system registry information to be added due to the patch, and may also include configuration database information. The reg keys portion 705 of the modified installation file 701 defines what registry keys will be created in the system registry 39 and provides values to be assigned to those registry keys. For example, the reg keys portion 705 may direct the installer program 201 to create an entry in the configuration database 202 identifying the new program file "newfile.dll" 315 (FIG. 3) by a token 316 and associating with that token a default path 318 to the new program file. It should be noted that the transforms portion 504 of the patch package 301 (FIG. 5) does not directly cause the installer program 201 to perform the functions it defines, but rather only to modify the installation file 233 during the creation of the modified installation file 701.

Another change defined by the transforms 504 is adding an "apply patch bits" portion 707 to the installation file 233. The apply patch bits portion 707 is a new portion of the modified installation file 701, i.e., the apply patch bits portion 707 does not appear in the original installation file 233. This is because the apply patch bits portion 707 defines alterations to existing program files, such as word.exe 230 (FIG. 2). The purpose and technique of altering existing program files is discussed in detail below with respect to FIG. 8.

The apply patch bits portion 707 of the modified installation file 701 defines how the installer program 201 is to alter existing program files with patch bits contained within the cabinets portion 506 of the patch package 301. The apply patch bits portion 707 defines which existing program files require patch bits, and points the installer program 201 to the applicable patch bits within the cabinets portion 506 of the patch package 301. The installer program 201 may contain a routine 340 for performing the actual alteration of the existing program file, or, alternatively, a separate application program (not shown) may be invoked to perform the alteration.

Returning now to step 607 of FIG. 6, the installer program 201 modifies the original installation file 233 in accordance with the transforms 504, creating the modified installation file 701. The modified installation file 701 now contains sufficient information to allow the installer program 201 to perform an installation (or more precisely a reinstallation) of the application in substantially the same manner as that described above with respect to FIG. 2. Because the modified installation file 701 contains instructions for applying the patch to the existing program files of the application, the application is patched as it is reinstalled. To the installer program 201 the reinstallation procedure appears substantially identical to an original installation, the only difference being that the changes to the application dictated by the patch, such as new program files or new patch bits, are applied to the application during the reinstallation. One of the benefits of this process is that when the installer program 201 stores the installed state of the application in the configuration database 202, the changes directed by the patch are incorporated in the installed state and are stored in the configuration database 202. After the installer program 201 has created the modified installation file 701, processing proceeds to step 609.

Figure 8:
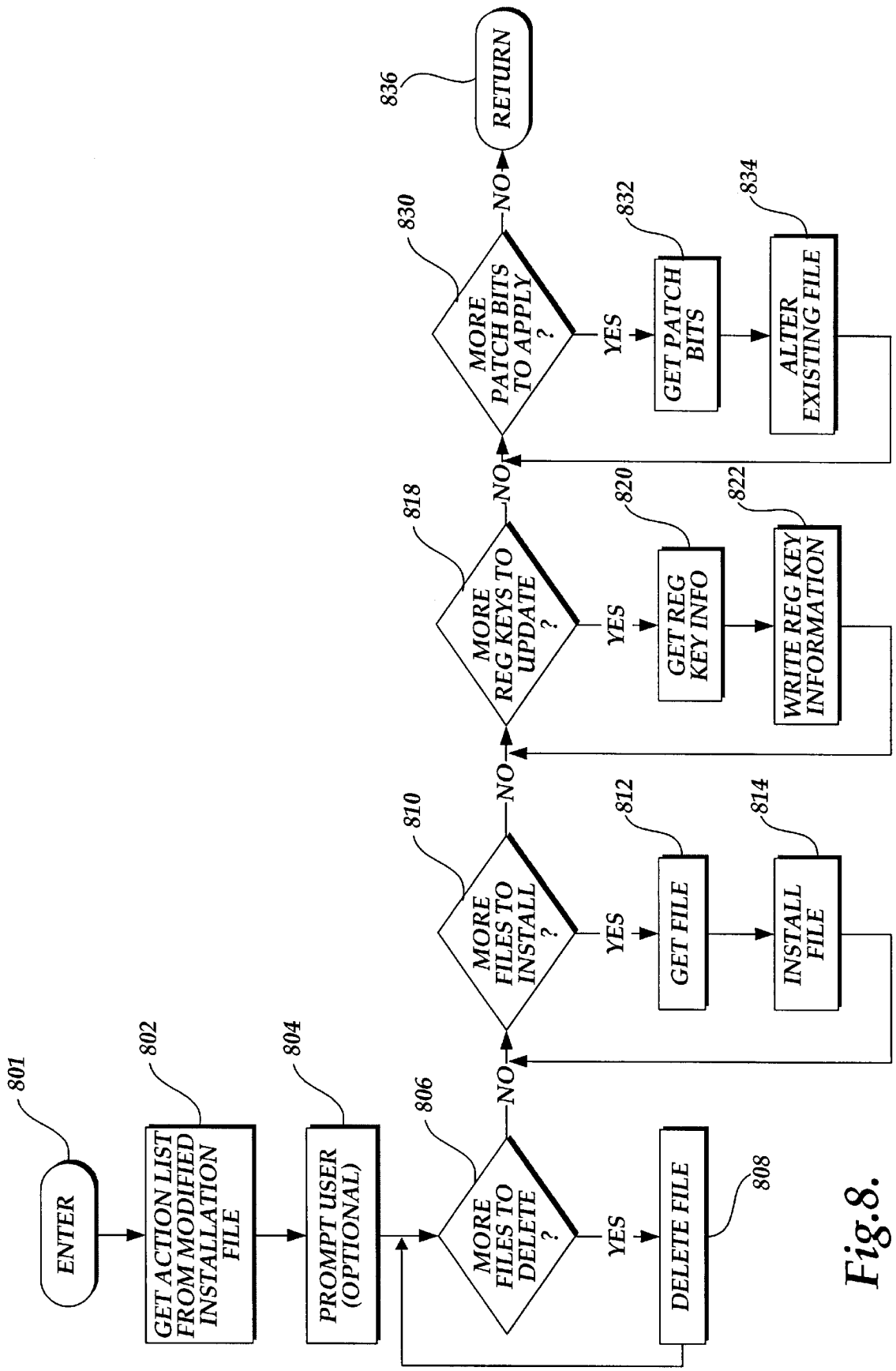
FIG. 8 is a logical flow diagram illustrating in detail the steps performed by the execute install based on modified installation file step illustrated in FIG. 6.

At step 609, the installer program 201 reinstalls the application in accordance with the instructions and information contained in the modified installation file 701. As mentioned, the modified installation file 701 defines each of the operations necessary to install the program files of the application, create appropriate entries in the system registry 39 and the configuration database 202. Additionally the modified installation file 701 causes any new program files to be installed and patch bits to be added. The installer program 201 executes each instruction contained in the modified installation file 701 in a way that properly installs the application including any changes introduced by the patch. The operations performed within step 609 are illustrated in FIG. 8 and described in greater detail below. Processing then continues to step 611 where the process returns to step 415 illustrated in FIG. 4 and described above.

FIG. 8 is a logical flow diagram illustrating in detail the operations performed by the installer program 201 during step 609 illustrated in FIG. 6 and generally described above. The process begins at step 801 and proceeds to step 802.

At step 802, the installer program 201 reads the instructions contained in the modified installation file 701 and begins processing the instructions. It should be noted that the remaining steps-illustrated in FIG. 8 and described below are performed in response to instructions contained in the modified installation file 701, illustrated in FIG. 7 and described above. Processing continues at step 804.

At step 804, if desired, the installer program 201 may prompt the user for installation configuration information, such as a desired installation folder or whether to install particular features of the application. The options presented by the prompt are defined within the modified installation file 701 and may be the same as in the original installation file 233; or may have been added by the patch. Alternatively, the installer program 201 may be configured to avoid prompting the user for input, and simply apply the patch without user intervention. Such a configuration may be achieved through a parameter of the original API call passed during step 403 (FIG. 4), or may be preconfigured within the installer program 201. If the user makes any configuration selections, those are stored in memory 25 (FIG. 1) for reference during the installation operation. Processing then proceeds to decision block 806.

At decision block 806, the installer program 201 determines whether there are program files to delete during the installation. The modified installation file 701 may direct the deletion of certain program files no longer required by the application as a result of the patch. For example, a new program file may render an older version of the same program file obsolete. Rather than leaving unused program files on the computer's hard disk drive 27, the installer program 201 deletes them. Accordingly, if at decision block 806, a program file remains to be deleted, the installer program 201 deletes that program file at step 808, and returns to decision block 806. This loop is repeated until no more program files remain to be deleted. When no more program files remain to be deleted, processing proceeds to decision block 810.

At decision block 810, the installer program 201 determines whether any program files are to be installed. This determination may be accomplished, for example, by the installer program 201 comparing a list of program files to be installed under the direction of the modified installation file 701 to a list of program files already installed. The list of already-installed program files is stored in the configuration database 202 maintained by the installer program 201. Depending on implementation, it may not be necessary for the installer program 201 to reinstall any program files indicated as installed. Obviously, any program files added by the patch are not indicated as installed in the configuration database 202. The installer program 201 will install those files. Processing then continues at step 812.

At step 812, the installer program 201 retrieves a program file that remains to be installed. In this regard, as discussed above, the installer program 201 retrieves and decompresses, as needed, any new program files from the cabinets portion 506 of the patch package 301. Also as mentioned, the cabinets portion 506 may be a separate file or files from the patch package 301 and reside on a server or the Internet accessible to the computer 20. The program file designated in the modified installation file 701 to be installed is retrieved by the installer program 201 at step 812. Processing the proceeds to step 814.

At step 814, the installer program 201 installs the file, i.e., writes the retrieved program file to the appropriate location. The appropriate location is typically a folder on the hard disk drive 27 of the computer 20, but may be any other location, such as a folder on a server accessible by the computer 20. For example, the installer program 201 may write newfile.dll 315 to the hard disk drive 27. The installer program 201 repeats steps 810 through 814 until all of the identified program files are installed. At that point, decision block 810 returns a negative result and processing proceeds to decision block 818.

At decision block 818, the installer program 201 determines whether any registry keys in the system registry 39 remain to be updated. In this regard, during installation, the installer program 201 writes and modifies entries in the system registry 39 pertaining to the installed application. Examples of such entries are user configuration settings for the application, computer specific parameters related to the application, version numbers for the application or its related program files, and the like. The patch may introduce new entries which need to be added to the system registry 39, or the patch may identify changes to existing registry entries, such as version identifiers. If registry key update, identified in the modified installation file 701, is required, the installer program 201 performs step 820. At step 820, the installer program 201 reads the proper registry value from the modified installation file 701. Thereafter, at step 822, the installer program 201 writes the value to the system registry 39. The installer program 201 remains in the loop formed by blocks 818, 820, and 822 until all registry key updates have taken place. When the system registry 39 has been fully updated in the manner just described, processing proceeds to decision block 830.

At decision block 830, the installer program 201 determines if patch bits are to be applied. As mentioned above, some existing program files of the application may need to be altered rather than replaced. Often, when the changes to a program file are small, such as simply changing a version identifier or small portions of binary code, rather than provide an entire new program file, only the bits reflecting the changed portion of the program file and suitable installation instructions are included in the patch package 301. As will be readily understood by those skilled in the art, this greatly reduces the size of the patch package. Accordingly, at decision block 830, the installer program 201 checks the apply patch bits portion 707 of the modified installation file 701 to determine if patch bits are to be applied. Typically, there will be at least one and likely several existing program files identified in the apply patch bits portion 707. In addition to identifying the program files, a stream of patch bits needed to alter that program file are identified in the apply patch bits portion 707. When a program file is identified, processing continues at step 832.

At step 832, the installer program 201 retrieves the appropriate patch bits for the identified program file. As mentioned above, the patch bits are stored within the cabinets portion 506 of the patch package 301. Thus, the installer program 201 retrieves the appropriate patch bits from the patch package 301. Then processing continues at step 834.

At step 834, the installer program 201 alters the program file by replacing the affected bits of the program file with the patch bits. This may be accomplished by the installer program 201 executing a patching routine that replaces the affected bits with the new patch bits. Since techniques for applying patch bits to a program file to achieve an altered or updated program file are known to those skilled in the art, such techniques are not described here. Thereafter, the process cycles back to step 830. The installer program 201 remains in the loop formed by steps 830, 832, and 834 until all patch bit installation instructions have been executed. After all of the affected program files have been patched, processing proceeds to return block 836, which returns control to step 611 of FIG. 6, ending the process of applying a patch to an installed application.

Uninstalling a Patched Application

On occasion, a user may desire to remove, or uninstall, an application previously installed. In the circumstance where the installed application has been patched, the present invention provides for the removal of any resources affected by the patch as well as the application itself.

Figure 9:
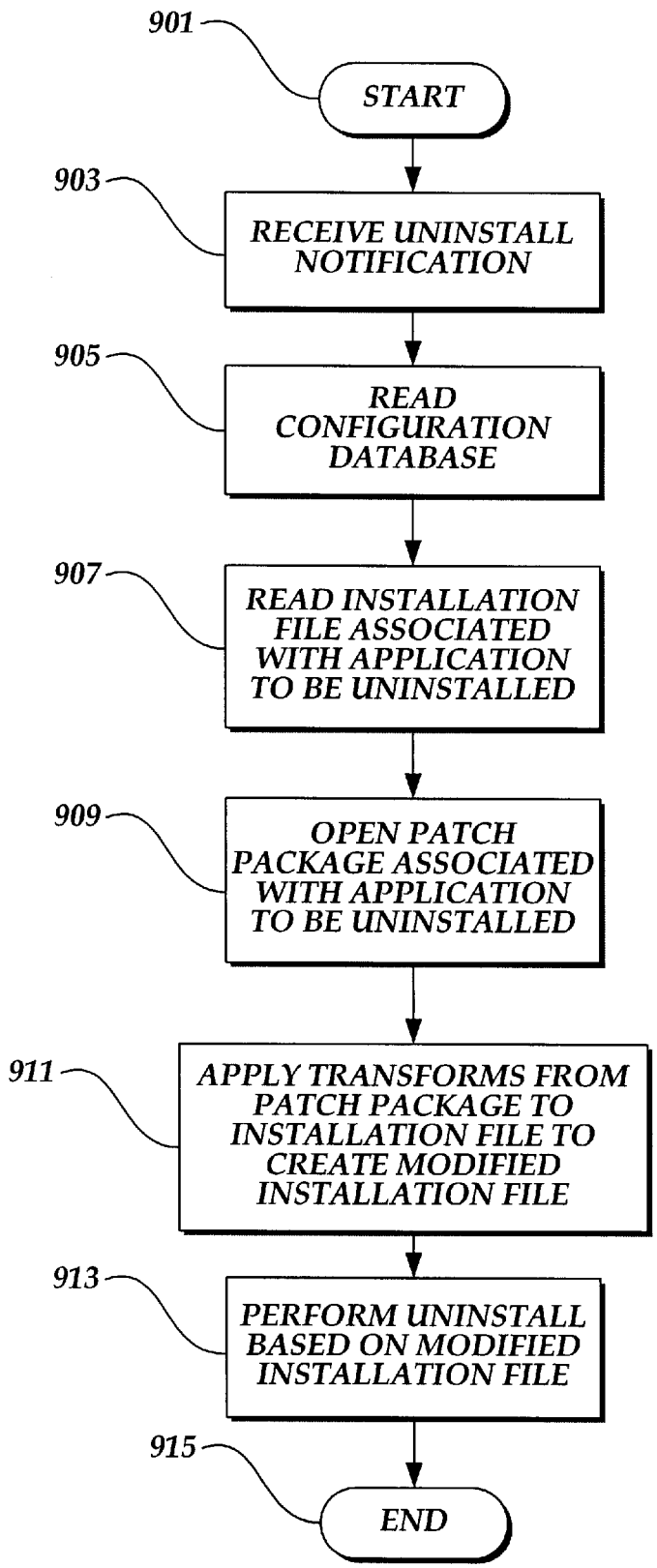
FIG. 9 is a logical flow diagram illustrating the steps performed during an uninstall of a software application patched in the manner illustrated in FIG. 6.

FIG. 9 is a logical flow diagram illustrating a process 900 for uninstalling an application including resources added or modified by a patch. The process 900 begins at start block 901, where a user has triggered the complete uninstallation of an installed application. Processing then proceeds at step 903.

At step 903, the installer program 201 recognizes the occurrence of an event triggering the uninstallation of the installed application. As with the installation, the event may be passing an API call to the installer program 201 from a standard dialog box provided by the operating system 35 (FIG. 1), or it may be by launching an executable file capable of triggering the uninstallation, or any other means for triggering an uninstallation. Processing then continues at step 905.

At step 905, the installer program 201 reads the configuration database 202 to determine the installed state of the application. As discussed in detail above, the installed state stored in the configuration database 202 includes appropriate references to any resources added or modified by the patch. Consequently, the configuration database 202 contains accurate information related to all of the installed resources, such as program files or registry keys, applicable to the installed application. After the configuration database 202 is read, processing proceeds to step 907.

At step 907, the installer program 201 reads the installation file 233 associated with the installed application. As discussed above, the installation file 233 contains the information necessary to identify each of the resources associated with the application. The installer program 201 uses the information contained in the configuration database 202 and the installation file 233 to identify the resources associated with and installed for the application, and the locations of those resources. Because, as discussed above, the installation file 233 does not include any changes introduced by the patch, the installer program 201 must modify the installation file 233 in similar manner to when the patch is applied before uninstalling the software application. Therefore, processing next proceeds to step 909 where the installer program 201 accesses the patch package 301.

At step 909, the installer program 201 accesses the patch package 301 at the location identified in the configuration database 202. In this regard, as mentioned above, preferably, the patch package 301 may be stored for future use during the patch apply procedure. The preferred storage location is on the computer's 20 hard disk drive 27. Uninstallation is one example of such future use. The location of the patch package 202 is stored in the configuration database 202 when the patch is applied. After the installer program 201 accesses the stored patch package 301 and reads the transforms portion 504, processing proceeds to step 911.

At step 911, the installer program 201 applies the transforms 504 to the original installation file 233 to create the modified installation file 701 in the manner described above with respect to step 607 of FIG. 6. In this embodiment of the invention, applying the transforms 504 is the same for uninstallation as for installation. As a result, the foregoing discussion is not repeated. After the modified installation file 701 is created, processing proceeds to step 913.

At step 913, the installer program 201 uninstalls the resources associated with the application based on the modified installation file 701. More specifically, the installer program 201 uses the modified installation file 701 to identify which resources are associated with the application, and then locates those resources using the information stored in the configuration database 202. The installer program 201 may simply delete program files associated with the application, and remove any entries in the system registry 39 associated with the application. It should be understood that the installer program 201 need not return any program files to their pre-patched state, i.e., remove any patch bits, prior to removing those program files. Once all of the resources associated with the application are removed, the process 900 terminates at end block 915. As will be appreciated by those skilled in the art and others from the foregoing description, uninstalling a software application using the modified installation file 701 rather than the original installation file 233 properly uninstalls resources affected by the patch.

Network Image Patch

An alternative embodiment of the present invention provides for the patching of a network image of a software application. Those skilled in the art will understand that a network image is essentially a network-resident installable copy of the package file 213 and the source 215 (FIG. 2) of a software application used during a stand-alone installation. The process of creating a network image on a server for access by server clients is often called a "network image install" or an "admin install." A network image allows individual users to install an application on their local machines from the server rather than from the original source 215. Patching a network image serves the purpose of allowing the server clients to install a patched version of an application, rather than installing the application and, then, patching each individual install.

Figure 10:
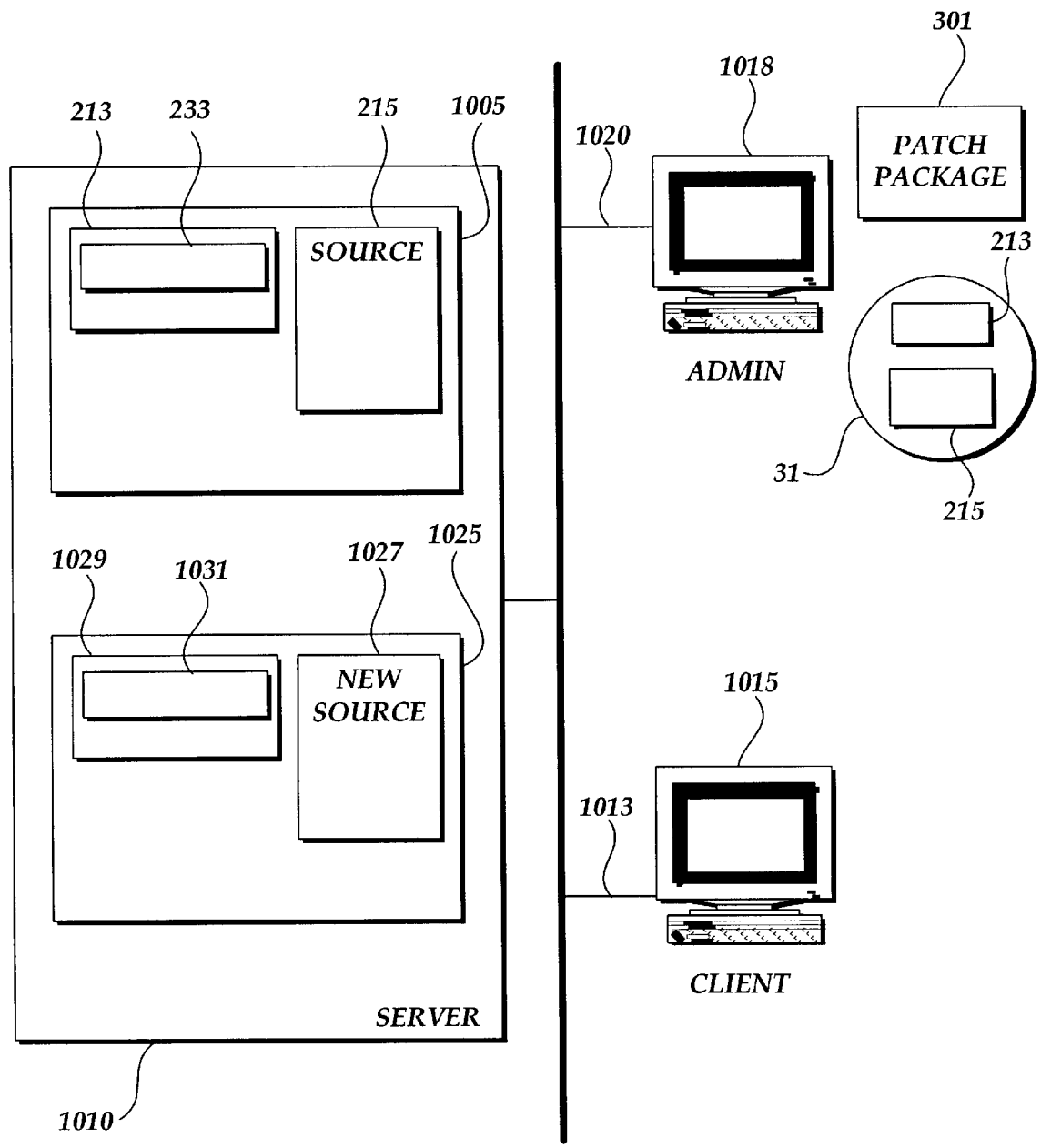
FIG. 10 is a functional block diagram of a network install performed in accordance with the present invention.

FIG. 10 is a functional block diagram of a network image 1005 installed on a server 1010. Resident on the server 1010 are decompressed copies of the application source 215 and the application package file 213, including the original installation file 233. As mentioned, the network image 1005 is essentially an installable copy of the files stored on the original medium on which the application was delivered, such as a CD-ROM disk.

The server 1010 is accessible, via network connection 1013, to the client computer 1015, which may be a conventional personal computer 20 as generally illustrated in FIG. 1 and described above. The patch package 301 may reside on an administrator's computer (admin computer) 1018, which may also be a conventional personal computer 20, or on the server 1010. The admin computer 1018 may additionally have access to the original application package 213 and source 215, such as through an optical disk drive 30 or the like. The admin computer 1018 and the client computer 1015 each include the installer program 201 described above. The illustrated server 1010 includes the current network image 1005, and a new network image 1025, discussed in greater detail below. In accordance with this embodiment of the invention, in order to ensure that users of the network are able to install a patched version of the application, the administrator applies the patch to the network image 1005 located on the server 1010, rather than apply the patch to each individual client networked to the. server 1010.

Figure 11:
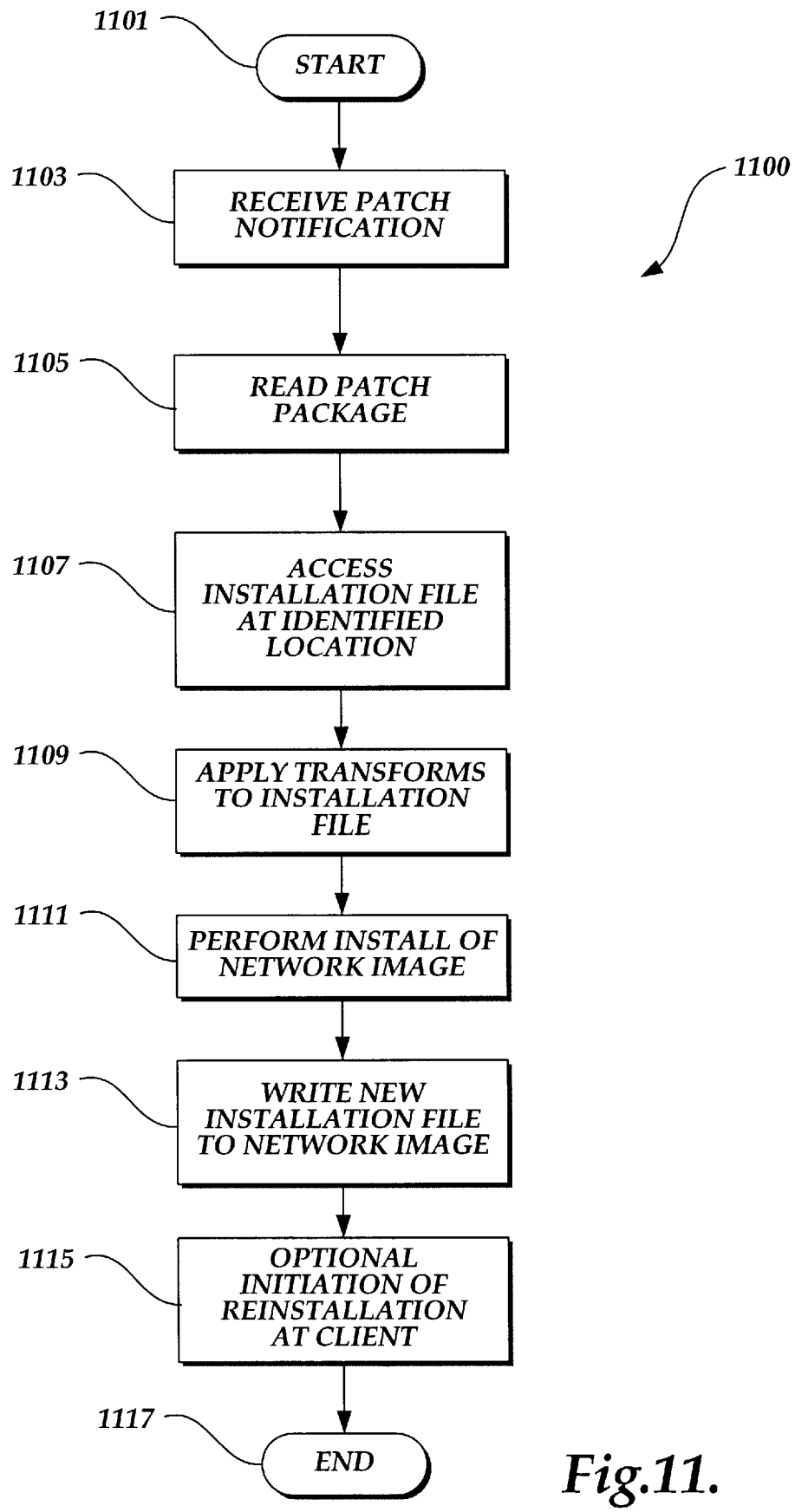
FIG. 11 is a logical flow diagram illustrating the steps performed during a network patch install performed in accordance with the present invention.

FIG. 11 is a logical flow diagram that, when taken in conjunction with FIG. 10, depicts a process 1100 formed in accordance with the invention for patching the current network image 1005 in a manner that creates the new network image 1025. The new network image 1025 is designed to be used to install a patched version of the software application on client computer 1015 networked to the server 1010. The process 1100 begins at starting block 1101, where a system administrator launches the patch package 301 from the admin computer 1018. At launch, the system administrator may provide, via an API parameter or other means, a path to the current network image 1005 and an indication that the patch will be applied to the current network image 1005, rather than to a stand-alone installation. After the patch package 301 is launched and read, processing resumes at step 1103.

At step 1103, the installer program 201 on the admin computer 1018 receives a notification that the patch package 301 has been launched. In addition, the installer program 201 receives, via the API parameter or other means, the path to the current network image 1005 and the indication that the patch is to be applied to the current network image 1005. The purpose of providing the path to the current network image 1005 is to allow the installer program to locate the original installation file 233 stored within the current network image 1005. After the launch notification is received, processing proceeds to step 1105.

At step 1105, the installer program 201 on the admin computer 1018 accesses the patch package 301 (FIG. 5). In this embodiment, the installer program 201 reads the summary 502 information and the transforms 504 information as in the previous embodiment. After the installer program 201 reads this information from the patch package 301, processing continues at step 1107.

At step 1107, the installer program 201 accesses and reads into RAM 25 the installation file 233 from the server 1010 via a network connection 1020. The installer program 201 uses the location provided above at step 1103 to locate the installation file 233. The installation file 233 is file of the type illustrated in FIG. 7 described above. After the installation file 233 is read into RAM 25, processing proceeds to step 1109.

At step 1109, in the manner described above with respect to step 607 (FIG. 6), the installer program 201 applies the transforms 504 to the installation file 233, creating a modified installation file 701. As also described above, the modified installation file 701 contains instructions sufficient for the installer program 201 to install resources associated with the application to the new network image 1025, install new program files added by the patch, and alter existing program files of the application, as required. Processing then proceeds to step 1111.

At step 1111, the installer program 201 installs the new network image 1025 based on the modified installation file 701. The installer program 201 decompresses, as needed, the program files derived from the application source 215 and copies the files to the new network image 1025. Patch bits included in the patch package 301 are then applied to the program files of a new source 1027. The resultant new source 1027 reflects the application in its properly patched state, including unchanged program files contained in the original source 215, new program files contained in the patch package 301, and any patch bits required to be applied to existing program files. Although this discussion describes and FIG. 10 illustrates the new network image 1025 as separate from the current network image 1005, those skilled in the art will appreciate that the new network image 1025 may overwrite the current network image 1005 such that only one network image resides on the server 1010.

In contrast to the previously described embodiment of the invention, during the network installation, registry key entries are not created in a system registry (not shown) on the server 1010 because the application is not expected to execute on the server 1010. Rather, it is expected that the application will be installed on client computers 1015 for execution on the client computers 1015. Processing then continues to step 1113.

At step 1113, a new installation file 1031 is written to the new network image 1025. The new installation file 1031 is substantially identical to the modified installation file 701, except that any information contained in the modified installation file 701 that is only used for applying patch bits to existing program files is omitted from the new installation file 1031. This information is omitted because the new network image 1025 is used to install the application to client computers 1015, and the new source 1027 contains all the necessary program files in their properly patched state. Thus, there is no need for the apply patch bits portion 707 of the modified installation file 701 after the network image 1025 installation. The transforms portion 504 of the patch package 301 includes information sufficient for the installer program 201 to identify and eliminate any such instructions from the modified installation file 701 when saved to the new network image 1025 as the new installation file 1029. When the new installation file 1031 is written to the new network image 1025, the network installation of the network image 1025 is complete, and processing continues at step 1115.

At step 1115, the administrator may optionally trigger a client update from the new network image 1025. In other words, in order to ensure that each user of the network has installed the most recent version of the application (including the patch changes), the administrator may trigger a reinstallation of the application at each client computer 1015. The triggering event may be any means for causing the client computer 1015 to reinstall the application, such as through a login script, an e-mail notification to the users, or the like. As each client computer 1015 reinstalls the application, the installer program 201 resident on each client computer 1015 performs an installation substantially as described above with respect to FIG. 2. It should be noted that because the new source 1027 of the new network image 1025 already reflect the proper program files in the proper patched state, there is no need to execute the patch package 301 at any client computer 301. The process terminates at ending block 1117.

While exemplary embodiments of the invention have been illustrated and described, it will be appreciated that various changes can be made without departing from the spirit and scope of the invention as defined by the appended claims.

The embodiments of the invention in which an exclusive property or privilege is claimed are defined as follows:

1. A computer-implemented method for patching an application and making an installer program aware that the application has been patched, comprising the steps of:
   recognizing that a patch has been launched to update the application, the patch including an identifier for the application and information related to a desired change to the application;
   accessing a first information store containing a series of instructions for installing the application;
   accessing a second information store containing information describing an installed state of the application;
   modifying the first information store in accordance with the desired change to the application such that the modified first information store includes additional instructions for applying the patch to the application;
   patching the application based on the modified first information store such that the desired change is reflected in the application after the patching; and
   storing information describing a new installed state of the application in the second information store, the new installed state information including an indication that the patch exists for the application and information related to the desired change to the application.

2. The computer-implemented method of claim 1, wherein the step of recognizing that the patch has been launched comprises receiving a notification from the patch that the patch has been launched.

3. The computer-implemented method of claim 2, wherein the notification comprises an application programming interface call.

4. The computer-implemented method of claim 1, wherein the first information store comprises an installation file containing information describing a multiplicity of resources associated with the application.

5. The computer-implemented method of claim 1, wherein the second information store comprises a configuration database maintained by the installer program, and the information describing the installed state comprises configuration information associated with the application and used by the installer program to provide functionality to the application.

6. The computer-implemented method of claim 5. wherein the configuration information comprises a product code uniquely distinguishing the application from another software application.

7. The computer-implemented method of claim 1, wherein the modifying the first information store step comprises:
  retrieving the additional instructions for applying the patch to the application from the information related to the desired change contained in the patch; and
  combining the additional instructions with the series of instructions in the first information store to create the modified first information store.

8. The computer-implemented method of claim 7, wherein the additional instructions comprise an install instruction to add a new program file to the application, the new program file being contained in the patch.

9. The computer-implemented method of claim 7, wherein the additional instructions comprise a registry key value for entry in a system registry containing configuration information associated with the application.

10. The computer-implemented method of claim 7, wherein the additional instructions comprise a list of affected program files and a corresponding list of patch bits for altering the affected program files.

11. The computer-implemented method of claim 1, wherein the patching the application step comprises installing a new program file for the application from the patch.

12. The computer-implemented method of claim 1, wherein the patching the application step comprises writing a new entry in a system registry associated with the application, the system registry containing configuration information associated with the application.

13. The computer-implemented method of claim 1, wherein the patching the application step comprises, responsive to the modified first information store, deleting an existing program file associated with the application that is not needed by the application after patching the application.

14. The computer-implemented method of claim 1, wherein the patching the application step comprises, responsive to the modified first information store. installing a new program file associated with the application and added by the patch.

15. The computer-implemented method of claim 1, wherein the patching the application step comprises, responsive to the modified first information store, writing an entry in a system registry containing configuration information related to the application.

16. The computer-implemented method of claim 1, wherein the patching the application step comprises, responsive to the modified first information store:
  retrieving from the patch a stream of patch bits representing an alteration to an existing program file associated with the application; and
  altering the existing program file to include the patch bits retrieved from the patch.

17. A computer-readable medium having computer-executable instructions for applying a patch to an installed application, which when executed perform steps comprising:
  receiving a notification that a patch file has been launched, the patch file including information related to a desired change to the installed application;
  accessing the patch file and reading-the information related to the desired change to the installed application;
  performing patching operations using the information related to the desired change read from the patch file, the patching operations operative to put the installed application in a new installed state; and
  updating a configuration database with state information related to the patch and with state information related to the new installed state of the installed application.

18. The computer-readable medium of claim 17, wherein the information related to the desired change comprises instructions to an installer program for performing the patching operations.

19. The computer-readable -medium of claim 17, wherein the performing patching operations step-comprises altering an existing program file associated with the installed application.

20. The computer-readable medium of claim 19, wherein altering the existing program file comprises reading patch bits from the patch file and applying the patch bits to the existing program file.

21. The computer-readable medium of claim 17, wherein the configuration database comprises configuration information related to the installed state of the installed application.

22. The computer-readable medium of claim 21, wherein the state information related to the patch comprises the existence of the patch and an indication that the patch has been applied to, the installed application.

23. The computer-readable medium of claim 22, wherein the state information related to the new installed state comprises an indication that an existing program file has been altered by applying patch bits from the patch to the existing program file.

24. The computer-readable medium of claim 17, wherein the performing patching operations step comprises installing a new program file from the patch to the installed application, and wherein the updating the configuration database step comprises storing in the configuration database the location of the new program file and an indication that the new program file came from the patch.

25. A computer-implemented method for removing an installed application including program files added by a patch to the installed application, comprising the steps of:
  receiving a notification of an uninstallation of the installed application;
  reading a configuration database to determine the installed state of the installed application, the installed state including an indication that the patch has been applied to the installed application, the installed state including a reference to at least one resource related to the patch; and
  performing an uninstallation of the installed application based on the installed state of the installed application.

26. The computer-implemented method of claim 25, wherein the configuration database in an information store containing information related to a plurality of resources associated with the installed application, the plurality of resources including system registry keys and program files.

27. The computer-implemented method of claim 26, wherein the information related to the plurality of resources includes an indication that a new program file was added by the patch to the installed application and the location of the new program file.

28. The computer-implemented method of claim 25, wherein the at least one resource is a new program file added by the patch. and the performing the uninstallation step comprises identifying the new program file from the installed state and deleting the new program file.

29. The computer-implemented method of claim 28, wherein the performing the uninstallation step comprises removing an entry in a system registry associated with the new program file.

30. The computer-implemented method of claim 25, wherein the performing the uninstallation step comprises the steps of:
creating a modified installation file from an existing information file and information contained in the patch, the modified installation file containing instructions for removing the installed application; and
executing the instructions contained in the modified installation file.

31. The computer-implemented method of claim 30, wherein a portion of the instructions for removing the installed application is related to the information contained in the patch.

32. A computer-implemented method for applying a patch to a network image of an application, comprising the steps of:
receiving a notification that the patch has been launched, the notification including an indication that the patch is to be applied to the network image of the application;
reading a patch package containing installation information needed to modify an installation file associated with the application during an installation of the network image, the patch package further containing bits of information for modifying a program file of the application;
modifying the installation file in accordance with the installation information to create a modified installation file; and
creating a new network image based on the modified installation file, the new network image containing the bits of information contained in the patch package.

33. The computer-implemented method of claim 32, wherein the notification comprises an application programming interface call, and wherein the indication that the patch is to be applied comprises a parameter of the application programming interface call.

34. The computer-implemented method of claim 33, wherein the notification further comprises a location of the installation file associated with the application.

35. The computer-implemented method of claim 32, wherein the modifying the installation file step comprises combining the installation information from the patch package with the installation file to create a modified installation file containing instructions for installing a new network image.

36. The computer-implemented method of claim 35, wherein the instructions for installing the new network image include new instructions for applying the bits of information contained in the patch package to the program file of the application.

37. The computer-implemented method of claim 36, wherein the new instructions comprise causing a patching routine to alter the program file to include the bits of information.

38. The computer-implemented method of claim 32, wherein the creating the new network image step comprises installing the application from an application source to the new network image by executing instructions contained within the modified installation file.

39. The computer-implemented method of claim 38, wherein the instructions contained within the modified installation file include causing an alteration of the program file of the application.

40. The computer-implemented method of claim 39, wherein the alteration of the program file comprises replacing existing bits of information in the program file with the bits of information from the patch package.

41. The computer-implemented method of claim 32, wherein the new network image comprises the application in a patched state and wherein the creating the new network image step comprises writing to the new network image a new installation file containing instructions for installing the application in the patched state to a computer from the network image.

* * * * *

UNITED STATES PATENT AND TRADEMARK OFFICE
CERTIFICATE OF CORRECTION

PATENT NO. : 6,434,744 B1
DATED : August 13, 2002
INVENTOR(S) : B.C. Chamberlain et al.

It is certified that error appears in the above-identified patent and that said Letters Patent is hereby corrected as shown below:

<u>Title page,</u>
Item [56], References Cited, OTHER PUBLICATIONS, insert in appropriate order:
-- Kelly, M., "Gain Control of Application Setup and Maintenance with the New Windows Installer," *Microsoft Systems Journal*, Sep. 1998, pp. 15-27. --
Item [74], *Attorney, Agent, or Firm*, insert in appropriate order:
-- *Attorney, Agent, or Firm*—Christensen O'Connor Johnson Kindness PLLC --

<u>Column 8,</u>
Line 31, "patch packaged" should read -- patch package --

<u>Column 10,</u>
Line 46, "installation procedure." should read -- installation procedure --

<u>Column 12,</u>
Line 46, "steps-illustrated" should read -- steps illustrated --
Line 56, "file 233; or" should read -- file 233, or --

<u>Column 16,</u>
Line 37, "to the." should read -- to the --

<u>Column 19,</u>
Line 1, "claim 5." should read -- claim 5, --
Line 41, "store. installing" should read -- store, installing --
Line 65, "reading-the" should read -- reading the --

UNITED STATES PATENT AND TRADEMARK OFFICE
CERTIFICATE OF CORRECTION

PATENT NO.    : 6,434,744 B1
DATED         : August 13, 2002
INVENTOR(S)   : B.C. Chamberlain et al.

It is certified that error appears in the above-identified patent and that said Letters Patent is hereby corrected as shown below:

Column 20,
Line 12, "computer-readable-medium" should read -- computer-readable medium --
Line 13, "step-comprises" should read -- step comprises --
Line 25, "applied to, the" should read -- applied to the --
Line 63, "patch. and" should read -- patch and --

Signed and Sealed this

Eleventh Day of March, 2003

JAMES E. ROGAN
*Director of the United States Patent and Trademark Office*